INVENTOR.
GEORGE M. ROSENBERRY, JR.
BY James C Davis Jr.
HIS ATTORNEY

INVENTOR.
GEORGE M. ROSENBERRY, JR.
BY
HIS ATTORNEY

United States Patent Office 3,416,061
Patented Dec. 10, 1968

3,416,061
POLYPHASE PULSE GENERATION CIRCUIT WITH VARIABLE PHASE SHIFT CONTROLLABLE TWICE PER CYCLE
George M. Rosenberry, Jr., Schenectady, N.Y., assignor to General Electric Company, a corporation of New York
Filed Jan. 30, 1967, Ser. No. 612,603
22 Claims. (Cl. 321—5)

ABSTRACT OF THE DISCLOSURE

A pulse generation circuit having a master time-delay generator energized twice per cycle to provide timing pulses occurring an electronically variable time after energization. The timing pulses alternately energize two separate outputs, each having a pair of separate sequentially operable slave time-delay generators. The circuit can be totally disabled, within 20 microseconds, by triggerable semiconductive devices shunting the pulse generator power supplies.

Prior art

Figure 1:
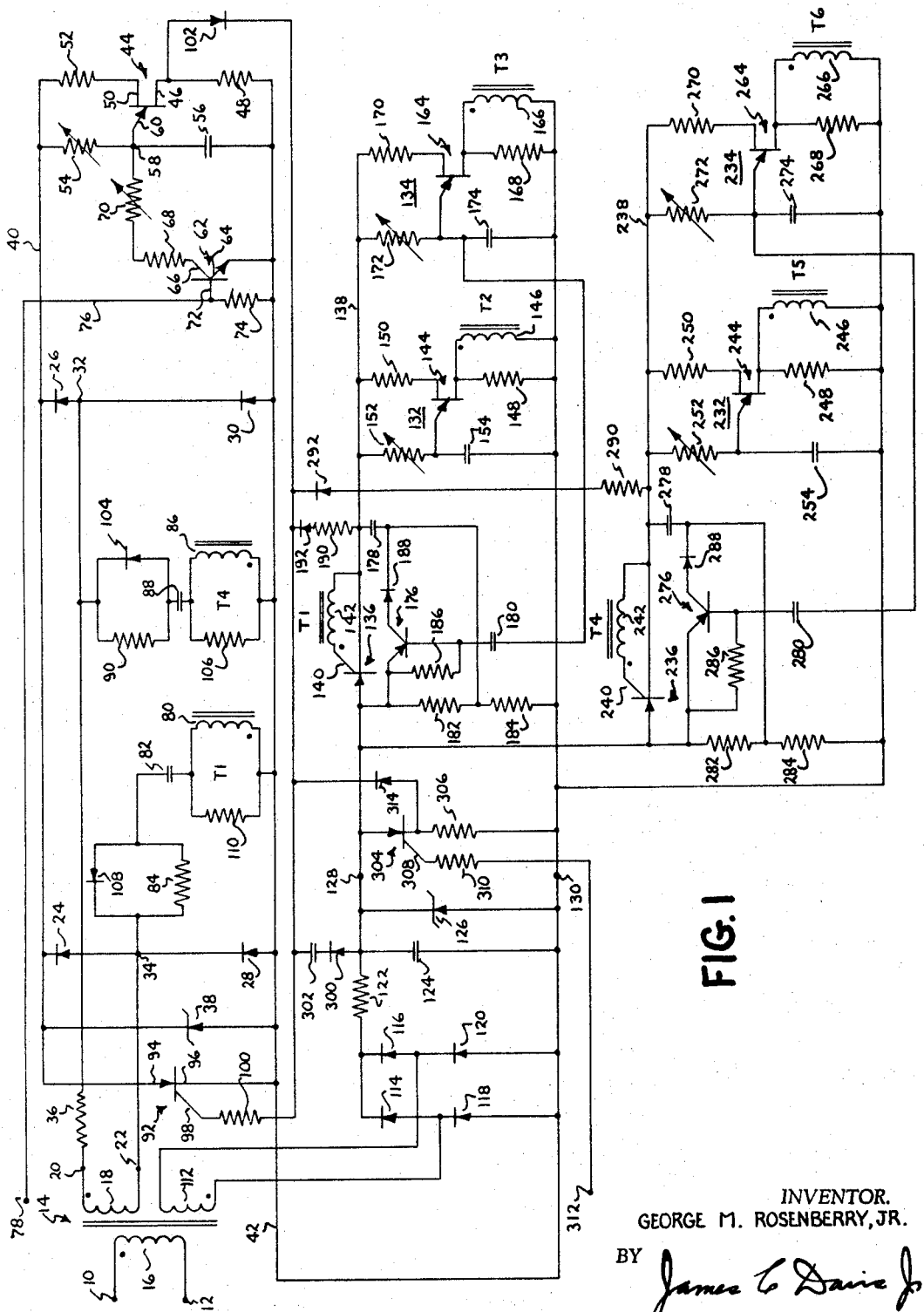

Firing circuits for use with polyphase phase controlled rectifiers and/or inverters have heretofore been constructed using a single master oscillator or pulse generator of electronically variable phase and five sequentially operating slave pulse generators. Such firing circuits have a control signal response time no shorter than 1 cycle and have not been adapted to positive means for preventing misfiring. Other firing circuits have featured a plurality of independently phased and synchronized triggering means. Firing circuits of this kind introduce tracking errors that contribute to unbalanced conditions and unduly multiply the required number of associated phase control circuits. Also, previously known firing circuits in general are not capable of a rapid and sustained shutdown within a very short time, for example, less than 20 microseconds, as is highly desirable in the interests of providing a reliable system under severe operating conditions and avoiding protective means that are complex and/or of very large physical size, particularly in the oftentimes desirable case of a system featuring a line commutated phase controlled inverter and/or rectifier.

Objects

It is a general object of this invention to provide a polyphase firing circuit, suitable for use with a line commutated phase controlled inverter and/or rectifier, that can be electronically disabled within about 20 microseconds or less.

Another object is to provide a polyphase firing circuit having a response time, to an electric control signal, no longer than ½ cycle.

Still another object of this invention is to provide a polyphase firing circuit featuring double pulsing, that is, providing six opportunities per cycle for inverter conduction in the absence of prior current conduction.

Yet another object is to provide a firing circuit that is of electrically adjustable phase, with positive stops on both ends of the control range that are independent of the magnitude of electric control signal.

Still another object is to provide a firing circuit with means for starting correctly and in which all pulses are present and in the proper phase relationship.

Yet another object is to provide a three-phase firing circuit wherein the pulses are spaced by 60° within a total tolerance of 3° under industrial ambient conditions to reduce unbalance or D-C components in the line currents.

Still another object is to provide an inverter firing circuit featuring double pulsing and wherein synchronism of corresponding pulses is assured.

Brief summary

The foregoing objects and others are achieved in accord with an embodiment of this invention by providing a firing circuit having a single master time-delay pulse generator that is intermittently energized from a clipped full-wave rectified source derived from one phase of an A-C source. The master generator operates twice per cycle to provide an output pulse, after an electronically variable time-delay from the time of energization. Means are provided to shunt the rectified source in response to each master generator pulse for the remainder of each half cycle and to generate an output pulse in one of two separate output transformers, depending upon whether the positive or negative half cycle is being currently rectified. A pair of sequentially operable slave time-delay pulse generators is associated with each output transformer to provide additional trigger pulses at 60° and 120° after the presence of an output pulse therein. Thus, two opportunities per cycle exist for varying the pulse timing in response to a change in the master generator time-delay command signal.

The master generator and each of the four slave generators are of the relaxation kind, preferably employing unijunction transistors or the like. In this way, an SCR or the like, can be connected in shunt with the power supply for the slave generators to disable them essentially instantaneously in response to a shutdown command signal. Furthermore, by coupling the SCR to the aforesaid means for shunting the rectified source, the entire firing circuit including the master generator is rapidly disabled at any arbitrary time in the firing sequence to positively prevent further output pulses.

Drawing

Figure 2:
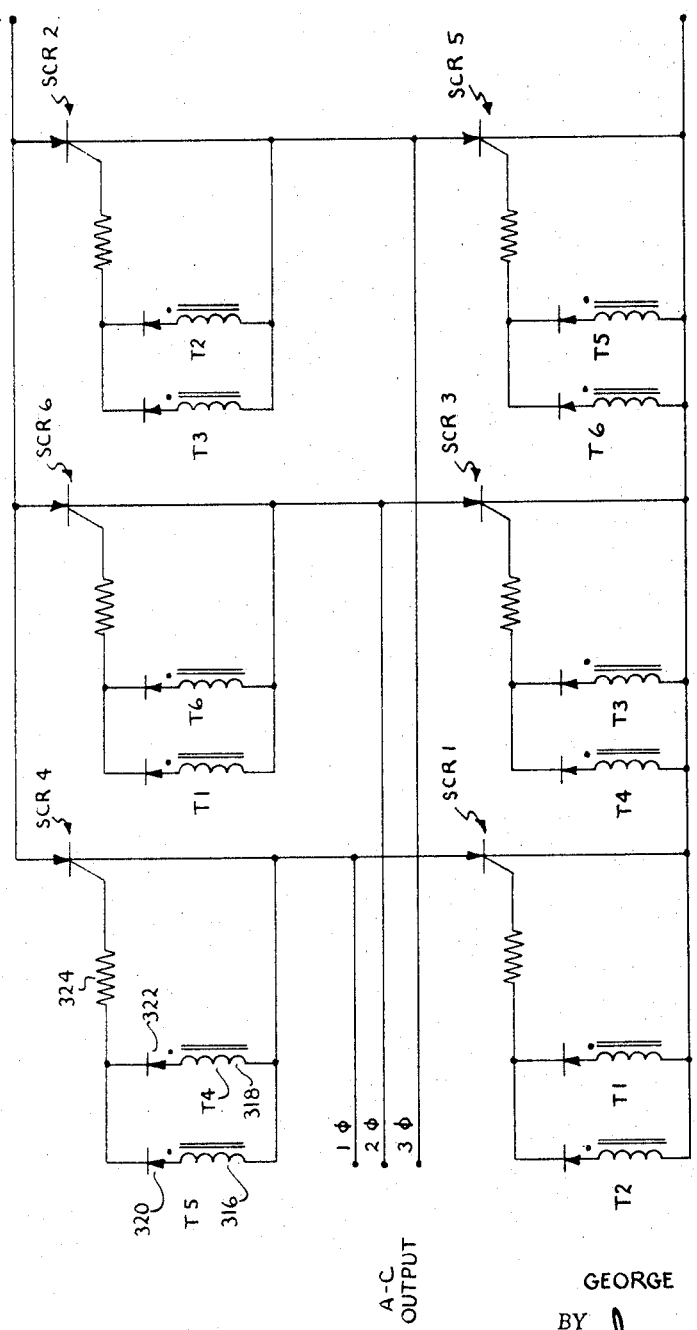

FIGURE 1 is a schematic circuit diagram of a firing circuit in accord with the present invention; and FIGURE 2 is a schematic diagram of a polyphase controlled inverter and/or rectifier illustrating a suitable connection of the firing circuit of FIGURE 1 thereto.

Detailed description

The illustrated embodiment of the invention is particularly adapted to serve a line commutated polyphase inverter which converts D-C power to A-C power for return to an otherwise energized A-C power system; in an environment of the kind described in my concurrently filed patent application Ser. No. 612,707, filed Jan. 30, 1967, for example. It is presently believed that this invention is of maximum utility in the illustrated kind of setting, although the teaching herein is equally applicable in connection with phase controlled rectifiers and A-C phase controlled systems, which generally represent a less demanding application because close synchronization with an existing system usually is not required.

In FIGURE 1, terminals 10 and 12 are adapted to be connected to an alternating-current source that corresponds respectively to the first and third phase sequence lines when the firing circuit is coupled to an inverter in the manner set forth in FIGURE 2. An isolation transformer 14 is advantageously provided having a primary winding 16, connected at its extremities to terminals 10 and 12, and a first secondary winding 18. Winding 18 serves as a source of single-phase alternating-current electric power and includes suitable winding terminals, as 20 and 22, at the respective extremities thereof.

A full-wave diode rectifier bridge, comprising diodes 24, 26, 28 and 30, is connected in the usual manner and the A-C input means 32 and 34 thereof are connected to and energized from winding 18. Toward this end, terminal 20 is connected through a current-limiting resistance 36 to A-C input means 32 and terminal 22 is connected directly to A-C input means 34. A substantially constant voltage regulating device, as Zener diode 38, is connected in shunt with the D-C output means of the bridge, represented by busses 40 and 42. The breakdown voltage of Zener diode 38 is selected preferably to be at least an order of magnitude less than the peak-to-peak A-C voltage induced in winding 18, so that the difference in potential between busses 40 and 42 is characterized by an essentially rectangular waveform commencing from zero at the beginning of each half-cycle from the A-C source. When a difference in potential exists, bus 40 is of positive polarity in respect to bus 42, in the illustrated embodiment, and the bridge and voltage regulating device can be considered to provide a clipped full-wave rectified output voltage corresponding in time of initiation and sequence to the positive and negative half-cycles from the single-phase A-C source.

In order to provide means for generating an electric trigger pulse a predetermined time after the initiation of each rectified half-cycle, a time-delay pulse generator is required that is responsive to each initiation of a potential difference between busses 40 and 42 to generate an output pulse a selected interval thereafter. A relaxation oscillator kind of time-delay pulse generator is depicted and comprises a voltage-breakdown negative resistance device, as unijunction transistor (UJT) 44, in FIGURE 1.

The first base 46 of UJT 44 is connected to bus 42 through an output resistance 48 and the second base 50 thereof is connected to bus 40 through a temperature stabilizing resistance 52. A resistance 54, that is conveniently selected to be adjustable, and a timing and charging capacitance 56 are connected in series from bus 40 to bus 42 with the common terminal 58 therebetween connected to emitter 60 of UJT 44.

Means for electronically varying the duration of time delay conveniently takes the form of an NPN transistor 62 having the emitter 64 thereof connected to bus 42 and the collector 66 thereof connected to terminal 58 through the series combination of a current-limiting protective resistance 68 and an adjustable resistance 70. The base 72 of transistor 62 is connected to bus 42 through an input resistance 74 and is connected by means of conductor 76 to an externally accessible control terminal 78.

In operation of the time-delay pulse generator, resistance 54 is adjusted to determine the maximum time delay available in response to any control signal condition, and resistance 70 is thereafter adjusted to determine the minimum time delay available under all conditions. When terminal 78 is thereafter connected to a source of positive voltage or current, the time delay will change inversely with variations in the magnitude of the control signal within the set time delay limits and over the effective range of control signal magnitudes. It is understood that capacitance 56 discharges through UJT 44 into resistance 48, providing an output pulse, whenever the accumulated charge on capacitance 56 bears a predetermined relationship to the interbase voltage of UJT 44.

The pulse delay generator comprising UJT 44 emits a pulse a predetermined time after it is energized at the commencement of each half-cycle. The inverter to be served by the firing circuit requires sorting of the output pulses in dependence upon the instantaneous magnitude of A-C input to the full-wave rectifier. Proper selection, or gating, is achieved in accord with the illustrated embodiment by having first and second trigger pulse output means each connected in the rectifier bridge circuit and providing means for shunting, or shorting, the D-C output of the bridge in response to each time delayed pulse from UJT 44.

More specifically, the primary winding 80 of a first firing pulse transformer, a capacitance 82 and a charging resistance 84 are connected in series circuit relationship from bus 42 to the A-C input means 34. A corresponding combination comprising primary winding 86, capacitance 88 and resistance 90 is connected in series from bus 42 to A-C input means 32 to provide the second trigger pulse output means. The D-C output means of the bridge rectifier, including busses 40 and 42, are shunted by a variable conductance device, as controlled rectifier 92, for example. Anode 94 of controlled rectifier 92 is connected to bus 40 and cathode 96 thereof is connected to bus 42. The associated gate 98 is connected to base one, 46, of UJT 44 by means of the series combination of a current-limiting resistance 100 and isolating diode 102.

In operation, controlled rectifier 92 is responsive to an output pulse from UJT 44 to establish a highly conductive path from bus 40 to bus 42, effectively short-circuiting the D-C output means of the rectifying bridge and at the same time generating an output pulse in one of windings 80 and 96, depending upon whether a positive or a negative half-cycle from winding 18 is currently being rectified. By way of explanation, assume that a positive half-cycle is present when A-C input means 32 is positive in respect to A-C input means 34. In this case, bridge diodes 26 and 28 are conductive and remaining bridge diodes 24 and 30 are back-biased. Capacitance 88 becomes charged and capacitance 82 does not because it is shunted by conducting diode 28. Accordingly, switching controlled rectifier 92 to the conductive state causes capacitance 88 to rapidly discharge therethrough through a series loop circuit consisting of resistance 90, diode 26, controlled rectifier 92 and winding 86. The rate of energy supplied to winding 86 is further increased by shunting resistance 90 with a diode 104 during the discharge of capacitance 88 and a damping resistance 106 is advantageously connected in parallel with winding 86 to reduce the probability of an extraneous response that may be occasioned by an unexpected circuit transient, for example. In the event that a negative half-cycle is currently present at A-C input 32 and 34, the reverse operation takes place and an output trigger pulse is supplied only to winding 80 in response to conduction of controlled rectifier 92. Diode 108 and resistance 110 correspond to diode 104 and resistance 106, respectively. In this way, the first and second trigger pulse output means comprising windings 80 and 86 serve as a gate to direct the output pulse only to the proper winding, depending upon whether the polarity of the A-C input to the rectifier bridge is negative or positive, respectively.

In the full-wave three-phase inverter bridge circuit, having six triggerable semiconductive devices, four additional trigger output pulses are required spaced in time at intervals of 60 and 120 electrical degrees from each of the pulses generated in windings 80 and 86. In the embodiment illustrated in FIGURE 1, the additional pulses are generated in two pairs of fixed time-delay pulse generators respectively associated with and initiated by the presence of pulses in windings 80 and 86. Each pair of additional pulse generators can be considered as slave time-delay pulse generators alternately driven from a master time-delay pulse generator comprising UJT 44.

A common D-C power supply is conveniently provided for the slave pulse generators and can include a second secondary winding 112 on transformer 14 that is connected to the A-C input of a bridge rectifier comprising diodes 114, 116, 118 and 120. The D-C output of the bridge is connected through a series filter and current-limiting resistance 122 to a filter capacitance 124, the voltage of which is regulated by means of a Zener diode 126, or the like. A substantially constant output voltage is maintained between terminals 128 and 130 during normal operation, in the well-known manner.

A first pair of slave pulse generators are indicated generally at 132 and 134, both being selectively supplied energizing power in response to conduction of controlled rectifier 136 which energizes bus 138. Controlled rectifier 136 includes a gate 140 which is connected to a secondary winding 142 that is inductively coupled to primary winding 80. The relationship is such that controlled rectifier 136 is switched to the conductive state in response to the presence of an output pulse in winding 80.

The first slave time-delay pulse generator comprises a UJT 144, or the like. Base one of UJT 144 is connected to terminal 130 through the parallel combination of a trigger pulse transformer primary winding 146 and a damping resistance 148 and the base two thereof is connected to bus 138 through a temperature stabilizing resistance 150. The timing circuit comprises a resistance 152, conveniently selected to be adjustable, and a capacitance 154 connected in series together from bus 138 to terminal 130 and having the point of common connection thereof connected to the emitter UJT 144.

In like manner, the second slave time-delay pulse generator comprises a UJT 164 having base one thereof connected to terminal 130 through the parallel combination of a trigger pulse transformer primary winding 166 and a damping resistance 168 and the base two thereof connected to bus 138 through a resistance 170. The timing circuit comprises an adjustable resistance 172 and a capacitance 174 connected in series together from bus 138 to terminal 130 and having the point of common connection thereof connected to the emitter of UJT 164.

A commutation, or "turn off," means for controlled rectifier 136 includes a transistor 176 that shunts rectifier 136 with a reversely charged commutating capacitance 178 in response to a base-driving pulse supplied through coupling capacitance 180 upon discharge of timing capacitance 174 in pulse generator 134. The ratio of resistance values in the divider comprising resistances 182 and 184 determines the amount of reverse charge that can be accumulated by capacitance 178, and bias resistance 186 ensures that transistor 176 is normally in a low conductivity condition. Diode 188 provides reverse voltage protection for the junctions of transistor 176. A resistance 190 and diode 192 are connected in series from bus 138 to the junction of diode 102 and resistance 100 and provide continued gate current to controlled rectifier 92 whenever bus 138 is energized.

The second pair of slave time-delay pulse generators advantageously is constructed the same as the first and shares a common mode of operation, except that secondary winding 242 is responsive to a pulse in primary winding 86, rather than 80 as in the case of winding 142. Accordingly, corresponding components are designated by numbers one hundred digits higher without more, to avoid unnecessary repetition of description.

Means are provided to establish conduction in controlled rectifier 92 immediately upon energization of the firing circuit, before energy is accumulated for any output pulses in order to preclude erroneous circuit operation commencing intermediate a half-cycle. A series diode 300 and small capacitance 302, connected from terminal 128 to the junction of resistance 100 and diode 102, give this safety feature in the illustrated embodiment. Other equivalent means, as an externally supplied transient pulse to the aforementioned junction during circuit initiation, will occur to those skilled in the art.

A primary feature of the invention is the capability of essentially instantaneous and continued disabling of all output trigger pulses in response to a sensed condition. By "instantaneous" it is meant that a totally quiescent condition for the firing circuit is achieved in less time than one tenth of the duration of a one-half cycle of normal operation, and by "continued" it is meant that the quiescent stated endures at least for the time required for 10 or more full cycle of normal operation, to ensure adequate time for mechanical circuit interrupters and other protective devices to function. Toward this end, means are provided to disable the power supply to the slave pulse delay generators and to actuate the rectifier bridge shunting means to the conductive state for a continued period.

In FIGURE 1, a controlled rectifier 304 is connected in series with a resistance 306 from terminal 128 to terminal 130, with the anode thereof connected to the former terminal. The gate 308 of controlled rectifier 304 is coupled by means including a series protective resistance 310 to an externally accessible control terminal 312. A diode 314 is connected from the junction of controlled rectifier 304 and resistance 306 to the junction of resistance 100 and diode 102, with its cathode connected to the latter junction.

FIGURE 2 illustrates a suitable combination of the firing circuit of FIGURE 1 with a line commutated three-phase full-wave controlled rectifier bridge inverter. The numbering of the six pulse transformers is carried over from similar designations in FIGURE 1. Two secondary windings per controlled rectifier are shown to provide synchronized double pulsing each cycle. The first trigger pulse is received corresponding to the time that the particular rectifier should be permitted to conduct current and the second pulse occurs 60 electrical degrees thereafter to re-establish or afford another opportunity for conduction in the event conduction terminated after or was not initiated by, respectively, the first pulse because of external circuit relationships. In this way, the inverter receives six opportunities per cycle to commence operation for the non-conductive state. The pulse transformer output windings, as 316 and 318, for example, are connected in series with isolating means, as respective diodes 320 and 322, for example, and the series combinations are connected in parallel together and in series with a current-limiting resistance, as resistance 324 from the cathode to the gate of the controlled rectifiers.

*Operation*

Resistances 54 and 70 are adjusted to set the minimum and maximum, respectively, phase lag limits appropriate for the inverter to be controlled. A typical range is from 90 to 155 degrees lag to ensure adequate phase margin for commutation in the event that the inverter utilizes the usual semiconductive controlled rectifiers, SCR's, or other kinds of thyretors, for example, silcon-controlled switches or triacs. Resistances 152 and 172 are adjusted to provide respective pulses in windings 146 and 166 that occur 60° and 120°, respectively, after bus 138 is initially energized. Resistances 252 and 272 are correspondingly adjusted in respect to energization of bus 238. Terminal 78 is connected to a source of positive polarity control voltage or current, that can be a manually adjusted potentiometer and battery combination (not shown), although a source of automatically sensed condition, as speed or torque of a motor, for example, would be more usual. Terminal 312 is connected to a source of positive electric signal responsive to a sensed condition, and means associated with an overcurrent condition in the inverter input supply lines represents a typical example.

Terminals 10 and 12 are connected to a source of alternating current providing a primary power supply and synchronizing source for the inverter firing circuit. The firing circuit is inhibited from undesirably commencing operation at the arbitrary time in a half-cycle at which connection to the primary source is made because the operation of diode 300 and capacitance 302 combine to provide a positive firing pulse to controlled rectifier 92, turning it "on." Controlled rectifier 92 remains in the conductive condition until it is commutated, or turned "off," at the end of a half-cycle, at which time proper operation can commence. The next half-cycle energizes bus 40 which initiates the time delay cycle of the master time delay pulse generator comprising UJT 44. At some interval thereafter, normally depending upon the magnitude of control voltage or current to terminal 78, UJT 44 conducts to send a conduction-initiating pulse to controlled rectifier 92.

Conduction of controlled rectifier 92 causes a first output trigger pulse to be generated in either winding 80 of pulse transformer T1 or winding 86 of pulse transformer T4, depending upon whether the instantaneous polarity of the A-C input signal to the bridge is negative or positive, respectively, all as described before. Assuming a negative instantaneous input polarity, winding 80 is energized and corresponding pulses are induced in secondary winding 142 and the other two secondary windings of transformers T1, shown in FIGURE 2.

The presence of a pulse in winding 142 establishes conduction of controlled rectifier 136 and energization of bus 138. Slave time-delay pulse generator 132 thereupon delivers a pulse to winding 146 of transformers T2 60° later and slave time-delay pulse generator 132 delivers a pulse to winding 166 of transformer T3, 120° after energization of bus 138. Bus 138 is concurrently de-energized by the commutating circuit including transistor 176. Thus, for the given half-cycle, transformers T1, T2 and T3 have provided the desired output pulses in a sequence spaced by 60° and using the time of occurrence of the first pulse at a time base, or reference.

The next half-cycle will be of positive polarity and a similar cycle is repeated only this time featuring transformers T4, T5 and T6, and their associated circuits. It will be noted that the first to fire of the slave generators in each pair also provides an extra pulse by charging once more each half-cycle; however, the additional pulse is merely extraneous and not deleterious to operation because it occurs during the normal 120° conduction cycle of the associated controlled inverter devices.

Whenever bus 138 or bus 238 is energized, a conduction-initiating bias is applied to the gate of rectifier 92. This is accomplished by diodes 192 and 292, and resistances 190 and 290 as described before. Accordingly, the master pulse delay generator is deprived of a possibly harmful opportunity to charge more than once each half-cycle, even though a circuit transient condition should prematurely extinguish conduction in controlled rectifier 92.

The presence of a suitable positive voltage at terminal 312 signals the need to rapidly disable the firing circuit. This is accomplished by the attendant switching of controlled rectifier 304 into high conductivity, which deprives the slave pulse generators of their operating voltages. In the event that either of bus 138 or bus 238 is concurrently energized, output pulses can occur from one or both associated slave pulse generators as the voltage is reduced; however, no further output pulses can be provided thereafter from any of the slave pulse generators. Also, conduction of controlled rectifier 304 causes a continuing positive bias to be supplied to controlled rectifier 92 through diode 314, thereby disabling the master time-delay pulse generating circuit. It has been found that a complete shutdown is readily achieved within 20 microseconds after a pulse is applied to terminal 312. In many cases it is desirable to provide means (not shown) to provide a pulse to terminal 312 when the associated system is de-energized, particularly if the usual contactors are used in the primary circuit.

The preferred illustrated embodiment features double pulse operation by using pulse transformers with two output windings. The necessary synchronism is thereby achieved and the triggering pulses can be short, for example, less than one twentieth of a cycle (approximately 800 microseconds at 60 c.p.s.), and of greater amplitude than otherwise permissible, all in the interest of achieving more rapid and efficient conduction in the controlled devices. This very desirable characteristic is sometimes called achieving a high $di/dt$ in the controlled devices.

Firing circuit operation has been described in terms of phase angles suitable for an inverter, that is to say, within the 90° to 180° lag range. It will be understood that inverter and rectifier operation is achieved by merely broadening the range to 0° to 180° lag and the latter operation alone falls within the 0° to 90° range. The A-C phase controlled system typically operates within the range of 60° lead to 240° lag, depending upon the reactive character of the served load.

The foregoing is a description of an illustrative embodiment of the invention, and it is applicant's intention in the appended claims to cover all forms which fall within the scope of the invention.

What I claim as new and desire to secure by Letters Patent of the United States is:

1. An electronic trigger pulse circuit comprising:
   (a) a master time-delay pulse generator providing a series of timing pulses during normal operation;
   (b) a first pulse output means and a second pulse output means;
   (c) switching means coupled to said master generator and said first and second pulse output means adapted to alternately energize said first and second pulse output means in response to said timing pulses to provide corresponding first and second sources of output trigger pulses having a frequency of occurrence equal to approximately one half of the frequency of occurrence of said timing pulses; and
   (d) a first pair of slave time-delay pulse generators coupled to said first pulse output means and energized in response to energization of said first pulse output means to provide sequential pulses at predetermined times after being energized, and a second pair of slave time-delay pulse generators coupled to said second pulse output means and energized in response to energization of said second pulse output means to provide sequential pulses at predetermined times after being energized.

2. The circuit of claim 1 including control means in said master time-delay pulse generator responsive to changes in the magnitude of a control signal to provide corresponding changes in the period of time-delay of said master generator.

3. The circuit of claim 2 including adjustable limit stops to determine the range of time-delay available in said master generator under any control signal conditions.

4. The circuit of claim 1 including means for de-energizing and resetting each of said pair of slave generators in response to an output pulse from the last to operate of the slave time-delay generators therein.

5. The circuit of claim 4 including disabling means responsive to energization of either of said first and second pair of slave generators to inhibit concurrent energization of said master generator.

6. The circuit of claim 1 wherein said switching means includes a first triggerable semiconductive device that is responsive to said timing pulses to de-energize and reset said master time-delay pulse generator.

7. The circuit of claim 6 including means responsive to energization of said slave generators to provide a trigger signal of corresponding duration to said triggerable semiconductive device.

8. The circuit of claim 6 including a second triggerable semiconductive device responsive to an external control signal to disable said first and second pairs of slave generators, and means coupling said second triggerable device to said first triggerable device connected to actuate the latter device to a state of sustained conductivity in response to switching of the former device to a sustained conductive state, whereby said pulse circuit is totally disabled.

9. The circuit of claim 8 wherein each of said master pulse generator and said slave pulse generators are of the relaxation kind featuring time measurement by the controlled charging of capacitances in response to energization.

10. The circuit of claim 9 wherein each of said master pulse generator and said slave pulse generators comprise a voltage-breakdown semiconductive device.

11. An electronic trigger pulse source comprising:
(a) a source of single-phase alternating-current electric power;
(b) a full-wave rectifier bridge connected to said source and providing a clipped full-wave rectified output voltage characterized by substantially rectangular intermittent waveforms corresponding in duration and sequence to the positive and negative half cycles, respectively, of said source;
(c) a master time-delay pulse generator of the relaxation kind connected to and energized by the output from said bridge for providing timing pulses;
(d) control means for varying electronically the time-delay from energization of said master oscillator to occurrence of a timing pulse therefrom;
(e) pulse output means connected to said rectifying bridge and responsive to the presence of a timing pulse to provide a firing pulse in one of two separate output devices, the selection depending upon the polarity of half-cycle being concurrently rectified;
(f) a pair of sequentially operable slave time-delay pulse generators respectively coupled to each of said firing circuit output devices and energized in response to firing pulses therein to provide corresponding time-delayed firing pulses to other separate output means; and
(g) shunting means including a triggerable device operative to disable said slave pulse generators.

12. The trigger pulse source of claim 11 including output means adapted to provide output trigger pulses in simultaneously occurring pairs and a line commutated polyphase inverter coupled to and controlled by said output means.

13. The trigger pulse source of claim 11 including a second triggerable semiconductive device connected in shunt with the D-C output of said bridge.

14. The source of claim 13 wherein said second triggerable device is coupled to said master time-delay pulse generator and actuated to the conductive state by said timing pulses therefrom.

15. The source of claim 14 including means coupled from said slave generators to said second triggerable device adapted to sustain conductivity of the latter device during energization of said slave generators.

16. The source of claim 14 including means coupled from said shunting means to said second triggerable device to sustain conductivity of the latter device and disable said master time-delay generator whenever said shunting means is triggered to disable said slave pulse generators.

17. The source of claim 14 including means coupled to said second triggerable device responsive to initial energization of said source to trigger said device to the conductive state, whereby random output pulses are avoided during start-up.

18. A phase control firing circuit comprising:
(a) a master time-delay generator adapted to generate timing pulses;
(b) rectifier means connected to said generator and adapted to be connected to a source of alternating-current power for energizing said oscillator with rectified positive and negative half cycles from said source;
(c) control means for electronically varying the time of occurrence of said timing pulses relative to the beginning of each half cycle of energization of said oscillator;
(d) pulse generating means coupled to said generator and including first and second pulse output means alternately actuatable by said timing pulses to provide respective first or second output trigger pulses depending on whether the positive or negative half-cycle, respectively, from said source is simultaneously being rectified;
(e) a pair of slave pulse generators coupled to each of said output means and responsive to said trigger pulses to provide additional trigger pulses delayed in time of occurrence therefrom; and
(f) means including a triggerable semiconductive device for disabling said firing circuit.

19. A pulse generator comprising:
(a) a full-wave bridge rectifier having first and second A-C input means and first and second D-C output means;
(b) a triggerable semiconductive device connected in shunt with said output means; and
(c) first and second pulse output means connected respectively to the first and second A-C input means and to said D-C output means to provide an output pulse from one of said output means in response to conduction of said device, the selection depending upon the instantaneous polarity of voltage at said A-C input means.

20. The generator of claim 19 wherein said output means each comprise the series combination of a pulse transformer winding, a capacitance and a resistance.

21. The generator of claim 20 including a diode connected in parallel with said resistance to shunt the latter when said capacitance discharges.

22. The generator of claim 21 including a damping resistance connected in parallel with said winding.

References Cited

UNITED STATES PATENTS

| | | | |
|---|---|---|---|
| 3,114,098 | 12/1963 | Rallo et al. | 321—47 X |
| 3,319,147 | 5/1967 | Mapham | 307—252 X |
| 3,321,641 | 5/1967 | Howell | 307—252 |
| 3,334,244 | 8/1967 | Hanchett | 307—252 X |
| 3,369,167 | 2/1968 | Hanchett | 321—18 |

JOHN F. COUCH, *Primary Examiner.*

WM. SHOOP, *Assistant Examiner.*

U.S. Cl. X.R.

307—252; 321—47